Oct. 26, 1965 J. F. REUTHER ETAL 3,214,735

DOUBLE BINARY CODING AND DECODING SYSTEM EMPLOYING NOR LOGIC

Filed April 29, 1960 3 Sheets-Sheet 1

INVENTORS
John F. Ruether &
Bernard R. Johnson
BY
Ralph W. McIntire
ATTORNEY

Fig. 4

| | | RESET | 1ST MARK SPACE | 2ND MARK SPACE | 3RD MARK SPACE | | |
|---|---|---|---|---|---|---|---|
| S | N14 | ON | OFF | OFF | OFF | N49 | RT |
| FF1 | N5 | ON | OFF | ON | OFF | N17 | FF3 |
| | N6 | OFF | ON | OFF | ON | N18 | |
| FF2 | N7 | ON | ON | OFF | OFF | N19 | FF4 |
| | N8 | OFF | OFF | ON | ON | N20 | |

Fig. 5

| SWITCH NO. | SIGNAL 1 PULSE 1 | SIGNAL 2 SPACE 1 | SIGNAL 3 PULSE 2 | SIGNAL 4 SPACE 2 | SIGNAL 5 PULSE 3 |
|---|---|---|---|---|---|
| MS1 | S | S | S | L | ANY LENGTH |
| MS2 | S | S | L | S | ANY LENGTH |
| MS3 | S | L | S | S | ANY LENGTH |
| MS4 | S | L | L | L | ANY LENGTH |
| MS5 | L | S | S | S | ANY LENGTH |
| MS6 | L | S | L | L | ANY LENGTH |
| MS7 | L | L | S | L | ANY LENGTH |
| MS8 | L | L | L | S | ANY LENGTH |

United States Patent Office 3,214,735

Patented Oct. 26, 1965

3,214,735

DOUBLE BINARY CODING AND DECODING SYSTEM EMPLOYING NOR LOGIC

John F. Reuther, Penn Hills, Pa., and Bernard R. Johnson, Champaign, Ill., assignors to Westinghouse Electric Corporation, East Pittsburgh, Pa., a corporation of Pennsylvania Filed Apr. 29, 1960, Ser. No. 25,735
7 Claims. (Cl. 340—167)

This invention relates generally to control systems in which a plurality of remote apparatus are selectively controlled by coded signals.

It has been proposed in copending application Serial No. 824,633, filed July 2, 1959, by Sheldon D. Silliman, and now abandoned, and assigned to the same assignee as the present application, that in a remote control apparatus utilizing coded signals to selectively operate a plurality of remote apparatus, the transmission time may be greatly diminished and the total efficiency of the system may be increased by providing binary coding characteristics not only to serial pulses, but to the spaces between the pulses as well, thus utilizing the hereinbefore wasted space between pulses as signal intervals. The length of each pulse and each space may be rendered long or short, depending upon the coding, so that the sending of three spaced pulses provides five signal intervals upon which a five digit binary code may be impressed as desired. This system of coding both pulses and intervening spaces is called double binary coding, that is, two different types of signals cumulatively coded in a binary manner. Generally, two different types of signals which may be sent in alternate contiguous relationship, such as pulses and spaces or positive and negative pulses, or different tones, provide the carrier system upon which is impressed binary coding in the form of long or short time duration on each of a predetermined number of consecutive signals.

There also has been proposed in copending application Serial No. 803,896, filed April 3, 1959, by William A. Derr et al., and now Patent Number 3,123,805, and assigned to the same assignee as the present application, a remote control apparatus having a "raise-lower" characteristic wherein a signal generator responds to the sustained operation of anyone of a plurality of code selection momentary switches to send out a signal code corresponding to the operated switch and wherein the last signal of the code is sustained so long as the operation of the code selection switch is sustained. A receiving station responds to each different signal code to initiate a different raise or lower operation depending upon the code as received, and continues the operation until the last signal of the code is terminated.

This apparatus utilizes a single error detecting self-checking code. The last signal is a check signal so that the code always has an odd number of short and long signals. If a single error occurs, the code will have an even number of short and long signals. Inasmuch as none of the decoder elements in the decoder are responsive to any of the even combinations, no output will be obtained for a single error. Double errors, which are more unlikely would cause misoperation. The five interval code utilizes four information signal intervals comprising two marks and two spaces. In each code, the first three signals identify the different elements to be operated, the fourth signal is a check signal and the last signal controls the operation.

Accordingly, it is an object of this invention to provide a double binary coding system in a remote control apparatus having raise-lower characteristics.

It is another object of this invention to utilize NOR element logic in control apparatus.

It is a further object of this invention to provide in a control station a multivibrator as a signal generator and including means operable to vary the length of each half cycle to provide signal length coding as governed by operation of code selection apparatus.

It is another object of this invention to provide in a control station having plural switches for effecting different coding operations of a signal generator, an electrical interlock means for preventing operation of the signal generator if more than one switch is operated at one time.

FIG. 4 is a chart relating to the operation of the binary counters of FIG. 2 and FIG. 3; and FIG. 5 is a chart illustrating the various codes utilized in this system to provide selective remote control operations.

As used herein, a NOR element is a circuit element providing an output only when none of a plurality of inputs are present.

As used herein, a FLIP-FLOP or memory circuit is a bistable circuit element providing an output in response to a first condition which is maintained even though the first condition thereafter is discontinued. The memory circuit is reset and the output terminated in response to a second condition. The output of a memory circuit is dependent upon the last of the plurality of inputs supplied thereto.

Figures 1, 2:
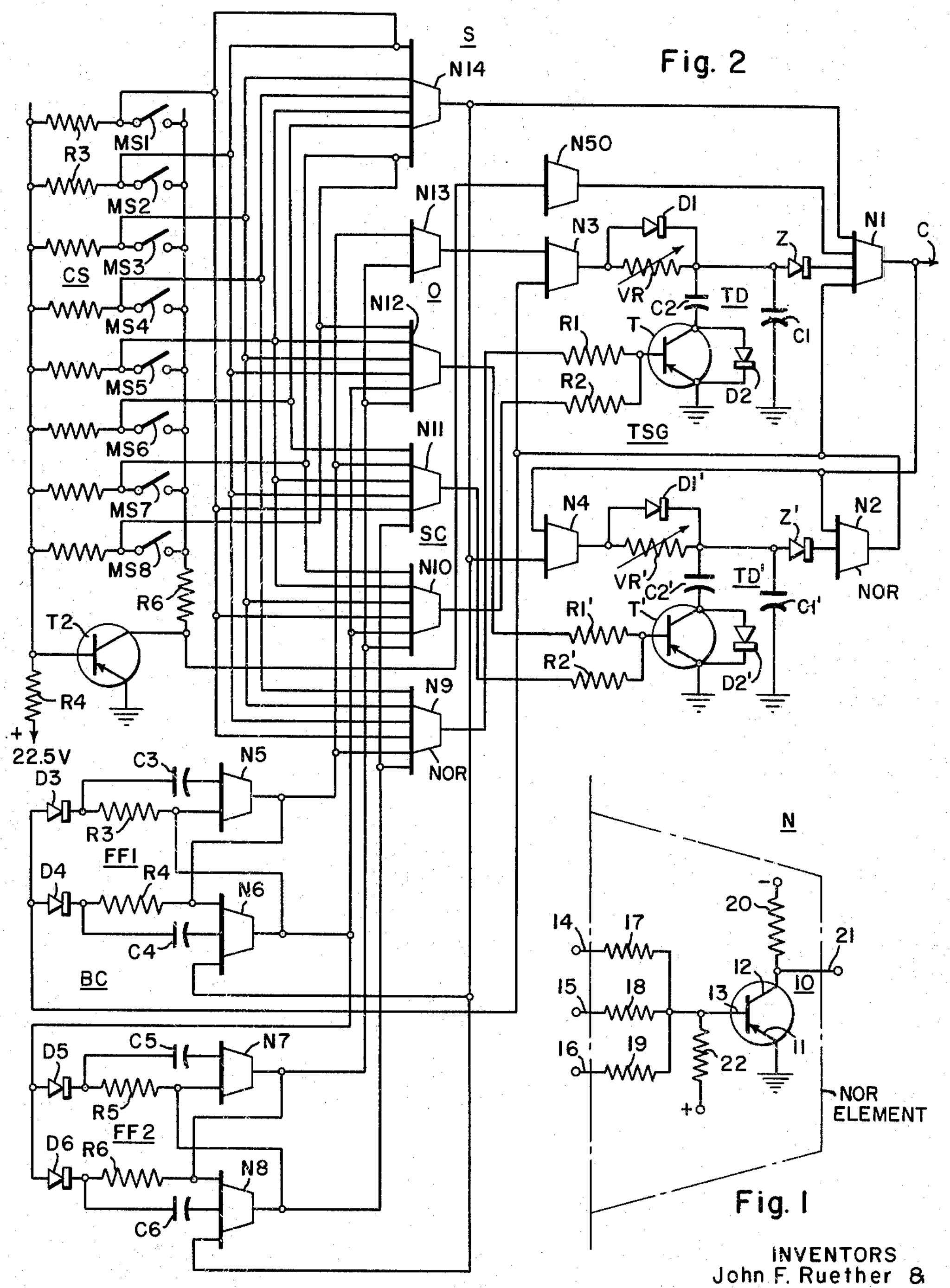
FIGURE 1 is a schematic diagram of a NOR element.
FIG. 2 is a schematic drawing of the control station in the control system.

Referring to FIG. 2, there is shown the control station signal transmitting equipment comprising a signal generator TSG which is operable to automatically transmit a series of spaced marks or pulses over a signal channel in response to the operation of a start element S. A signal coder SC is operable to control the signal generator to render the individual pulses and spaces long or short in predetermined coded arrangements. An operating element O is operable to lock up the signal generator to effect continuation of the last pulse of the code. A binary counter BC is operated by the signal generator TSG to count a predetermined number of pulse or mark signals from the signal generator, and cooperates with a code selector CS comprised of a plurality of individually operable momentary switches to operate the signal coder to effect long or short duration of a predetermined number of the individual pulses and spaces in accordance with a code as selected by the code selector CS. The binary counter BC operates the operating element O at the end of the count to effect lock up of the signal generator TSG to sustain the last pulse until the operated momentary switch is returned to the normal condition. Upon cessation of operation upon the code selector CS, the start element S operates to reset the binary counter BC and the signal generator TSG.

Figure 3:
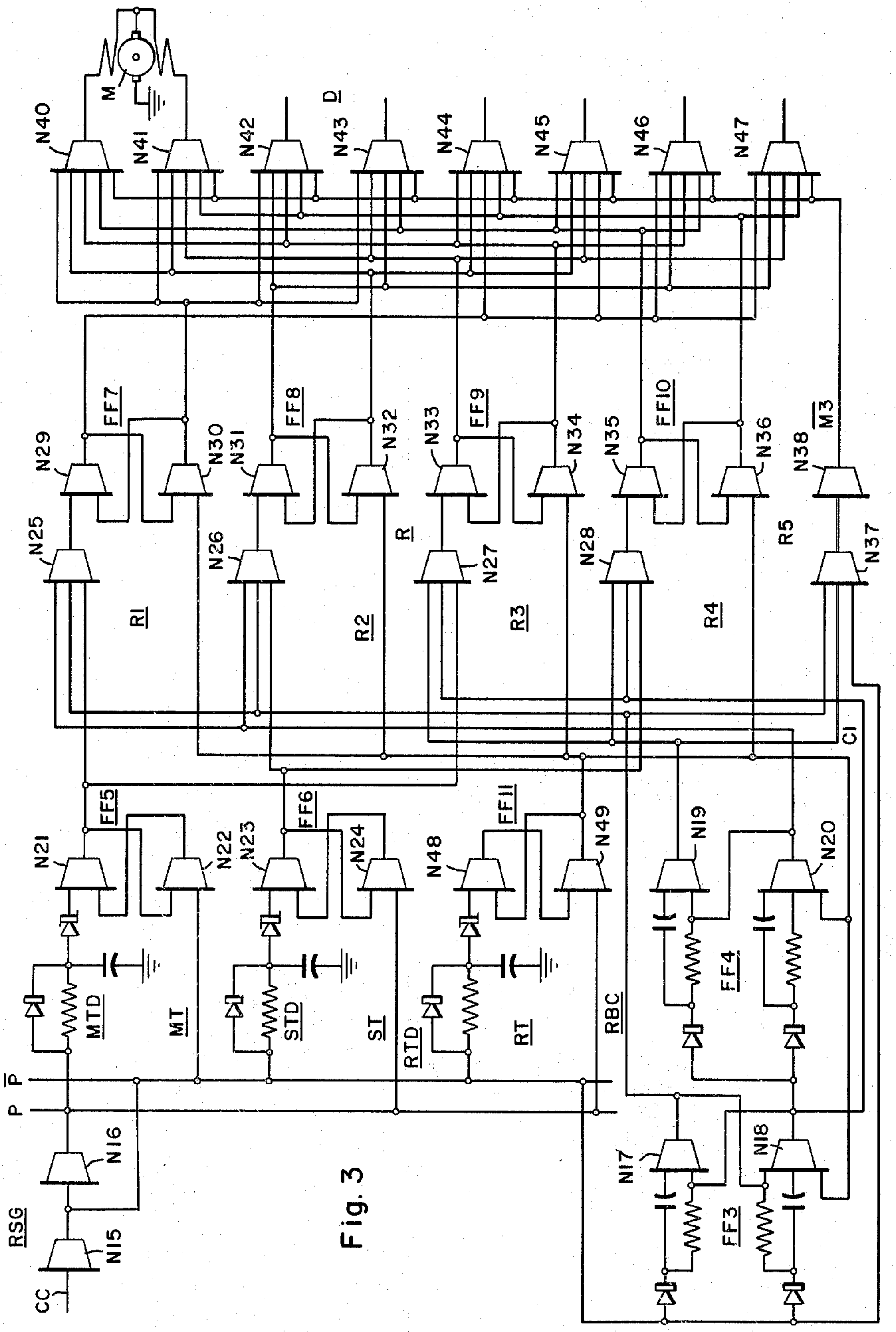
FIG. 3 is a schematic drawing of the remote station in the control system responsive to signals from the control station of FIG. 2.

Referring now to FIG. 3, there is shown the remote station receiving equipment including a receiving signal generator RSG for reproducing signals corresponding to the pulses and spaces on the signal channel. A receiving binary counter RBC is provided to advance one step in response to each pulse or mark signal as provided by the receiving signal generator RSG. A mark timer MT is provided to respond to operation of the signal generator RSG to determine the length of each mark signal. A space timer ST is provided to respond to the operation of the signal generator RSG to determine the length of each space signal. A register system R responds to the combined operation of the mark timer MT, space timer ST, and signal counter RSG to provide an accumulated indication of the length of each pulse and space in the order received. A decoder D responds to operation of the register system R to provide an appropriate output to operate the apparatus corresponding to the received signal code. Upon cessation of the last mark signal, a reset timer RT responds to operation of the signal generator RSG to reset the register R, and the binary counter RBC.

The apparatus at both the control station and the remote station are comprised of NOR elements connected in various combinations to provide a variety of logic functions which perform the operation of the control apparatus as hereinbefore broadly described, and as hereinafter described in detail.

*NOR element*

A NOR element which may be used in this invention is illustrated in FIG. 1 of the drawing, wherein a transistor generally indicated at 10 includes a semiconductor body having an emitter electrode 11, a collector electrode 12 and a base electrode 13. The emitter electrode 11 is connected to ground, and the base electrode 13 is connected to a plurality of input terminals through respective impedances 17, 18 and 19. The collector electrode is connected through an impedance 20 to a B— voltage source and is also connected to an output terminal 21. An impedance 22 is connected between the base and positive to bias the base-emitter circuit to cut off the transistor.

In operation, when there is no negative input at any of the input terminals 14, 15 and 16, the transistor is in the cutoff operating condition so that an output signal of aproximately the same potential as the B— source appears at the output terminal 21. In this cutoff condition, the NOR element is providing a negative signal at output 21 and thus is considered to be turned on. Alternatively, if a negative signal is provided at any one or more of the input terminals 14, 15 or 16, so as to drive the transistor 10 to the saturated operating condition, the output terminal 21 will be effectively connected to ground through the substantially zero impedance of the transistor, thus terminating the negative signal at the output terminal 21. In this saturated condition, the NOR element is not providing a negative signal at output terminal 21 and thus is considered to be turned off. Thus, considering the negative signal as the signal which is either present or absent, it is seen that the structure of FIG. 2 performs the NOR logic function as hereinbefore defined.

*Transmitter signal generator*

The transmitter signal generator TSG is a multivibrator producing a substantially square wave output, and having a controllable variable time delay characteristic to provide for varying the length of each consecutive output signal. The signal generator is comprised of a first pair of NOR elements N1, N2, each having an input connected to the output of the other. An auxiliary NOR element N3 has an input connected to the output of N2 and has its output connected through a variable time delay means generally indicated at TD, and a Zener diode Z to an input of NOR element N1. Likewise, an additionally auxiliary NOR element N4 has an input connected to the output of NOR element NL and has its output connected through a time delay means generally indicated at TD′ and a Zener diode Z′ to an input of NOR element N2.

The variable time delay means TD is an R-C circuit having variable resistance and variable capacitance to provide a varible time constant characteristic, and is comprised of variable resistor VR connecting the output of NOR element N3 to the input of Zener diode Z, a first capacitor C1 having one side connected to ground and having the other side connected between the resistor VR and Zener diode Z, and a second capacitor C2 having one side connected to ground through the collector-emitter circuit of a transistor T and having the other side connected to the same potential point as the other side of the first capacitor C1. The transistor T comprises a static switch to connect the capacitor C2 to ground only when transistor T is saturated in response to the presence of a signal at its base. A diode D1 shunts the variable resistor VR to provide for a rapid reset of capacitors C1 and C2 when the NOR element N3 is providing no output signal. An additional diode D2 is provided in shunt relationship across the collector-emitter electrodes of transistor T to cooperate with diode D1 in resetting capacitor C2.

The time delay circuit TD′, is connected between the output of NOR element N4 and the input of NOR element N2 and is identical to the time delay circuit TD as previously described. Accordingly, corresponding parts have been assigned the same reference characters with the addition of the suffix (′).

Operation of the signal generator TSG will now be described.

When the apparatus at the control station is in a normal reset or rest condition, the start element S operates in a manner hereinafter described to provide a continuous output signal to an input of each of the NOR elements N1 and N4 of the signal generator TSG. Under these conditions, each of NOR elements N4 and N1 are off, thus providing no output. Accordingly, NOR element N2 is turned on because of lack of input signals at any of its inputs, thus providing a signal to an input of NOR element N3, which accordingly assumes the off condition. It is to be noted that the off condition of NOR element N3 has no effect on NOR element N1 because of the presence of a signal from start element S at another of the input terminals to N1. Thus, in the reset condition NOR element N1 is off to provide no signal to the signal channel C. At the same time, the NOR element N2 is in the on condition to provide a signal to reset the binary counter BC in a manner to be hereinafter described in detail.

When the start element S is turned off during the initiation of a coding operation, NOR elements N1 and N2 alternatively turn on and off to provide a series of spaced pulses on the signal channel C. The signals from the signal generator TSG appear on the signal channel only on the first half cycle of each full cycle of operation since only the NOR element N1 is connected to the signal channel. Specifically, when the start signal element S turns off, NOR element N4 turns on to provide an output signal through resistor VR′ to the capacitor C1′ and the Zener diode Z′ in series with the base-emitter circuit (not shown) of the NOR element N2. Initially, the capacitor C1′ effectively shunts the NOR elements N2 so that substantially all the B— supply voltage for NOR element N2 is disposed across resistor VR′. Thereafter, as energy builds up in capacitor C1′, the B— supply voltage divides between the resistor VR′ and the Zener diode Z′ with the voltage across VR′ diminishing and the voltage across Zener diode Z′ increasing until the Zener breakdown voltage is equaled and exceeded, at which time the signal from NOR element N4 is passed through Zener diode Z′ to NOR element N2 which turns off to thus eliminate the previously described output signal to NOR elements N1 and N3. The elements N3 and N1 immediately turn on inasmuch as no other input signals are present at any of their respective input terminals. Accordingly, NOR element N1 applies a pulse signal to the signal channel to begin a first half cycle of operation of the signal generator TSG and at the same time applies a signal to each of the NOR elements N4 and N2 to maintain NOR elements N4 and N2 in the off condition. This condition is sustained until the time delay capacitor C1 builds up a voltage sufficient to effect voltage division between resistor VR and Zener diode Z of such proportion as to effect breakdown of Zener diode Z, to permit passage of these signals from NOR element N3 to the input terminal of NOR element N1. Thus, NOR element N1 turns off to cutoff the signal to the signal channel C and to NOR elements N4 and N2 which now turn on to start the other half cycle, at the end of which half cycle N1 turns on again to start another first half cycle.

From the foregoing description, it is seen that when NOR element N2 goes off, NOR element N1 turns on immediately and stays on until time delay circuit TD passes a signal from NOR element N3 to turn off NOR element N1, and alternatively, when NOR element N1 turns off, NOR element N2 turns on immediately and stays on until time delay circuit TD′ passes a signal from NOR element N4 to turn off NOR element N2. Thus, it is seen that the magnitude of the capacitor C1′ in time delay circuit TD′ governs the time duration of the signal from NOR element N2, while the magnitude of the capacitor C1 in time delay circuit TD governs the time duration of the signal from NOR element N1. The capacitors C1 and C1′ provide a predetermined time delay, adjustable in accordance with the initial setting on the variable resistors VR and VR′, to provide equal length pulse and space signals of predetermined minimum time duration on the signal channel C. The length of any pulse or space may be lengthened beyond the predetermined minimum length during operation of the signal generator TSG merely by adding capacitance during a pulse or space. Specifically, this increase in capacitance is achieved by applying signals from the signal coder SC, in a manner to be hereinafter described in detail, to the transistors T or T′, as the case may be, to connect the respective capacitors C2 and C2′ in parallel with the corresponding capacitors C1, C1′, respectively, thus increasing the total capacitance of the time delay circuits TD and TD′ to increase the time required for the voltage across the respective Zener diodes Z and Z′ to build up to the prescribed Zener breakdown voltage. For example, when NOR elements N1 and N3 turn on, NOR elements N2 and N4 turn off immediately and if no signal is present from the signal coder SC to saturate transistor T to connect capacitor C2 to ground, then the signal from NOR element N3 is delayed only a short time before turning off NOR element N1 which terminates the pulse. However, if transistor T is saturated, as it would be by a signal from the signal coder SC calling for a long pulse, the capacitor C2 is additionally connected to capacitor C1, to thus provide a long time delay action, which permits NOR element N1 to remain on a longer time and to thus provide a long pulse on the signal channel. Similarly, signals from the signal coder SC to the transistor T′ calling for a long space, adds capacitor C2′ to the time delay circuit TD′ to provide a long space on the signal channel.

*Binary counter*

Generally, the binary counter BC responds to operation of the start element S and to each operation of the transmitter signal generator TSG to count each pulse signal applied to the signal channel, and cooperates with the code selector CS to control the signal coder SC to send signals to the transistors T and T′ in signal generator TSG to lengthen the signal during appropriate ones of the pulses and spaces in the selected code.

The binary counter BC is adapted to count only the pulses or marks, so that in the code having five signal intervals comprised of three pulses and two intervening spaces, the counter assumes a first output for the normal or reset condition of the control station, a second output condition for the first pulse and first space, a third output condition for the second pulse and second space, and a fourth output condition for the third pulse. As mentioned above and as will be hereinafter described in detail, each of the second and third count conditions of the binary counter BC cooperate with the output from the code selector CS to preset the signal coder not only for the immediate pulse being counted, but also for the next succeeding space as well.

Specifically, the binary counter BC is comprised of a pair of FLIP-FLOPS FF1 and FF2 connected in tandem so that their cumulative output comprises a binary count of the pulses on the signal channel, as generally described above. The FLIP-FLOP FF1 is comprised of a pair of NOR elements N5 and N6, each having its output connected to the other NOR element at a point between a corresponding one of resistors R3, R4, respectively, and a first input to the other NOR element. The other end of each resistor R3, R4, respectively, is connected through one of a pair of capacitors C3, C4, respectively, to a second input of the same NOR element. A pair of diodes D3, D4 are each connected at the forward end to a point between one of the resistor-capacitor pairs R3, C3 and R4, C4, respectively, and at the reverse end to a common point connected to the output of NOR element N2 in the signal generator TSG. A third input of NOR element N6 is connected to the output of start element S. The outputs of NOR elements N5 and N6 are connected to the signal coder SC to control coding in a manner hereinafter described in detail.

The other FLIP-FLOP FF2 is identical to the above-described FLIP-FLOP FF1 and is comprised of a first NOR element N7 and corresponding circuit elements including a capacitor C5, resistor R5 and diode D5, and a second NOR element N8 and corresponding circuit elements including capacitor C6, resistor R5, and diode D6, all interconnected in the same fashion as the previously described NOR elements N5 and N6 and their corresponding elements in the FLIP-FLOP FF1. The reverse sides of the diodes D5 and D6 are connected in common to the output of NOR elements N6 of FLIP-FLOP FF1 rather than to an output of the signal generator TSG. An additional input of NOR element N8 is connected to the output of start element S.

Referring to the foregoing description, operation of the binary counter BC will now be described in terms of operation of the individual FLIP-FLOPS FF1 and FF2 taken separately and collectively. When the control station is at rest, start element S is providing a signal directly to the third input of NOR element N6 of FLIP-FLOP FF1 and at the same time the signal generator TSG is providing a signal from NOR element N2 to both NOR elements N5 and N6 of FLIP-FLOP FF1 at diodes D3, D3, respectively. Referring to FIG. 1, it is seen that when a NOR element is in the on condition, it is providing a negative output signal. Accordingly, the signal from NOR element N2 is ineffective at the inputs of FLIP-FLOP FF1 because of the blocking action of diodes D3 and D4. The signal from the start element S to NOR element N6 turns off NOR element N6, which effects turn-on of NOR element N5. NOR element N5 provides a signal to an input of NOR element N6 to maintain the latter in the off condition, and at the same time charges capacitor C4 through resistor R4 and input resistors in N6. Thus, in the normal rest condition, NOR element N5 is in the on condition and NOR element N6 is in the off condition. When start element S turns off, effecting a start operation, FLIP-FLOP FF1 remains in the rest or reset condition until the signal generator TSG operates in the manner hereinbefore described to produce the first pulse signal on the signal channel, at which time NOR element N2 in the signal generator TSG turns off to ground diodes D3 and D4. This allows condenser C4 to discharge through diode D4. The discharge current is such that the base current in the transistor in NOR element N6 is momentarily reduced. The output voltage magnitude of NOR element N6 begins to increase tending to saturate NOR element N5 reducing the magnitude of its output voltage. This tends to further turn off NOR element N6. The action is cumulative with the result that the state of FLIP-FLOP FF1 reverses with NOR element N5 off and NOR element N6 on. When NOR element N2 again comes on diodes 3 and 4 are lifted from ground potential and again block any flow of current. The output of NOR element N6 now charges condenser C3. The next time NOR element N2 is turned off and diodes D3 and D4 are grounded, condenser C3 discharges returning FLIP-FLOP FF1 to its normal reset state in a manner similar to that described above following the discharge of condenser C4. Each successive grounding of diodes D3 and D4 effects a change in FLIP-FLOP FF1 from one condition to the other. FLIP-FLOP FF2 operates in a manner identical to that previously described relating to FLIP-FLOP FF1. However, inasmuch as FLIP-FLOP FF2 is controlled exclusively by FLIP-FLOP FF1, except in the reset condition when start element S provides an output signal to NOR element N8, the two FLIP-FLOPS FF1 and FF2 do not assume the same operating condition at the same time.

Referring now to the chart of FIG. 4 illustrating the various count conditions of the binary counter BC, the relative conditions for each of the FLIP-FLOP elements FF1 and FF2 and their respective NOR elements is illustrated for each successive count condition of the binary counter BC. Referring to FIG. 4, it will be seen that for the reset condition and each of the successive mark-space signals, the accumulated outputs of NOR elements N5, N6, N7 and N8, comprise a different combination of signals comprising a binary count of successive marks applied to the signal channel.

*Signal coder*

The signal coder SC is comprised of four NOR elements N9, N10, N11 and N12 which are connected to control operation of the time delay systems TD and TD′ in the signal generator TSG in response to the joint operation of the code selector CS to be hereinafter described in detail and the binary counter BC, described above. Each of the NOR elements N9, N10, N11 and N12 is preassigned to control the length of one of the pulses or spaces in the first four signal intervals in the five signal interval code. The length of the fifth and last signal, a pulse, is controlled by a hold signal to be hereinafter described in detail.

Thus, NOR element N9 has its output connected to transistor T in the long pulse time delay circuit TD and is assigned the function of providing an output signal to control the length of the first signal, a pulse, if the code selector CS has selected a code having a long pulse as the first signal. To this end, NOR element N9 has its inputs connected to the output from the code selector CS and the binary counter BC so that all inputs to NOR element N9 will be off only if the code selected is calling for a long mark on the first mark or pulse. Accordingly, one input to NOR element N9 is connected to the output of NOR element N5 of FLIP-FLOP FF1 while another input to NOR element N9 is connected to the output of NOR element N8 of FLIP-FLOP FF2. Since NOR elements N5 and N8 are off simultaneously only during the first pulse and first space count of the binary counter (see FIG. 4) NOR element N9 is capable of providing an output only on the first pulse and only if the other inputs to NOR element N9 from the code selector CS are not receiving signals from the code selector CS. Thus, it is seen that control of the NOR element N9 is effected by the binary counter BC in the first mark-space count condition in combination with predetermined output signals from the code selector CS. The NOR element N11 has its output connected to transistor T′ in the long space time delay circuit TD′ and is assigned the function of providing an output to control the length of the second signal, comprising the first space. Accordingly, NOR element N11 has two of its inputs connected to the output of NOR elements N5 and N8, as does previously described NOR element N9, so that operation of the binary counter to the first count condition as hereinbefore described simultaneously sets up operation of both NOR elements N9 and N11 to control the length of the first mark and first space as the signal generator TSG operates. Inasmuch as the binary counter BC retains this condition until the second mark appears, as has been previously described, it is seen that the first count condition of the binary counter BC sets up signal length control for both the first and second signal, comprising a mark and a space, respectively.

Similarly, inasmuch as the second pulse or mark as provided by the signal generator TSG effects operation of the binary counter BC to assume the second count condition wherein both NOR elements N6 and N7 are off (see FIG. 5) these two outputs are connected to the inputs of each of NOR elements N10 and N12 to set up control of pulse length time delay circuit TD and space length time delay circuit TD′, respectivey, for the third and fourth signals, comprising a mark and a space, respectively.

*Operating element*

The operating element O is comprised of a NOR element N13 operable to lock up the signal generator TSG to provide a continuous pulse to the signal channel to provide operation of the selected apparatus at the remote station as hereinafter described. The operating element responds to operation of the binary counter BC in counting the last signal of the code. Specifically, NOR element N13 includes two inputs, one input connected to the output of NOR element N5 in the binary counter BC while the other input in connected to the output of NOR element N7 in the binary counter BC. The output of NOR element N13 is connected to an input of NOR element N3 in the signal generator TSG. In operation, when the binary counter BC assumes the output condition for counting the third or last pulse, as indicated in FIG. 4, NOR elements N5 and N7 are off, thus terminating all inputs to the NOR element N13 which then provides an output signal to NOR element N3 causing it to turn off and remain off so long as the NOR element 13 is providing an output. This action terminates all input signals to NOR element N1, which then continues to provide a signal to the signal channel until terminated by cessation of operation of the code selector element.

*Code selector*

The code selector CS is comprised of a plurality of momentary switches MS1–MS8, each operable when closed to provide an output signal from the negative terminal of an appropriate direct current source to one input of each of a predetermined different combination of NOR element N9–N12 in the signal coder to thus cooperate with binary counter BC in controlling the length of each of the first four signals in the selected code.

For example, the operation of momentary switch MS3 connects the negative terminal of the direct current source through the switch to one input of each of the NOR elements N9, N10 and N12, thus leaving only NOR element N11 with no input signal from the code selector when momentary switch MS3 is operated. Accordingly, as the binary counter BC operates in counting the signals from the signal generator in the manner as hereinbefore described in detail, each of the NOR elements N9, N10 and N12 will always have input signals present from the code selector even when the binary counter BC turns off its input signals to the NOR elements N9, N10 and N12 in the predetermined sequence as hereinbefore described. Accordingly, no input signal will be provided to operate the corresponding time delay circuits TD, TD′, respectively, so that the first signal, the third signal and the fourth signal will be short. However, when the binary counter turns off its inputs to NOR element N11 on the first count condition as previously described with respect to the chart of FIG. 4, no input signal will be present at any of the inputs to the NOR element N11, which then provides an output signal to saturate transistor T′ in time delay circuit TD′ to effect a long space when the pulse generator sends the second signal. In this manner, operation of momentary switch MS3 in the code selector CS cooperates with the binary counter BC to provide the code comprised of a first short signal S, a second long signal designated L, a third short signal designated S, and a fourth short signal designated S. The fifth and last signal, a pulse, may be any length for reasons hereinafter set forth in detail. Similarly, each of the other momentary switches MS2–MS8 is connected to an input of a different combination of NOR elements N9–N10 to provide the coding as set forth in the chart of FIG. 5.

An electrical interlock is provided in the code selector CS to prevent any misoperation from occurring as the result of the closing of more than one momentary switch at any one time. The interlock is comprised of a transistor T2 having a base connected in common to an end of each of a plurality of resistors R3, each resistor having the other end connected to a different one of the momentary switches MS1–MS8 for energization by the negative terminal of the direct current source only when the corresponding momentary switch is closed. The emitter of the transistor 82 is connected to common or ground while the collector is connected first through an impedance R6 directly to the negative terminal of the D.C. source, and second, to the input of NOR element N50 having its output connected to an input of NOR element N1. A positive voltage is applied through resistor R4 to bias the transistor T2 to the cutoff condition. If one switch is closed, the positive bias on the base is reduced but the transistor T2 remains cut off. If an additional momentary switch is closed, base current is drawn and transistor T2 saturates to terminate the input to NOR element N50 which turns on to turn off NOR element N1 in the signal generator TSG.

*Start element*

The start element S comprises a single NOR element N14 having a plurality of inputs, each connected through a different one of the momentary switches MS1–MS8 to the negative terminal of a direct current source so that operation of any one momentary switch turns off the start element S, which then terminates its output at NOR elements N1 and N4 of the signal generator TSG to effect starting of the pulse generator as hereinbefore described, and also terminates the input to NOR elements N8 and N6 of the binary counter BC to permit starting of the binary counter BC by the signal generator TSG as hereinbefore described. When the operated momentary switch is released, start element S provides its output signal to stop the signal generator as hereinbefore described, and also to reset the binary counter BC as also hereinbefore described.

*Typical operation of the control station*

Assuming momentary switch MS3 is closed, a negative input from the direct current source is applied through the closed switch to an input of NOR element N14 and start element S, which turns off its output to NOR elements N1 and N4 in the signal generator TSG and to the NOR elements N6 and N8 in the binary counter BC. Upon termination of the output signal from start element S, the binary counter BC remains in the reset condition (see FIG. 4), while the signal generator TSG begins to operate automatically. Inasmuch as time delay circuit TD' is not at this time turned on, NOR element N2 turns off after a short time delay to immediately effect turn on of NOR element N1 to apply the first signal, a pulse, to the signal channel. As NOR element N2 goes off, it effectively grounds both diodes D3 and D4 of FLIP-FLOP FF1 effecting a change in the binary counter BC from the reset condition to the first count condition for the first mark-space count (see FIG. 4). The signals from the binary counter BC are combined with the signals from the momentary switch MS3 at the input of the NOR elements N9, N10, N11, and N12 in the signal coder SC to produce the following output conditions: N9 off, N10 off, N11 on, and N12 off. Accordingly, NOR element N11 provides an output to turn on long space time delay circuit TD'. All of the foregoing operations have been carried out in only a few microseconds after turn on of NOR element N1 in the signal generator TSG. Inasmuch as long pulse time delay circuit TD is not turned on, NOR element N1 turns off after a short time delay, about .03 second, thus completing a short pulse, and NOR element N2 turns on to start the second signal, a space. This time NOR element N2 stays on a longer time to provide a long space because transistor T' in long space time delay circuit TD' is saturated to add capacitor C2' to the time delay system. After this longer time delay (about 0.1 second) the NOR element N1 turns on again to provide the third signal, a second pulse, to the signal channel, and at the same time NOR element N2 turns off to effect advancement of the binary counter BC to the next condition for counting a second mark-space signal combination (see FIG. 4). These new signals from the binary counter combine with the signals from the switch MS3 at the inputs of NOR elements N9, N10, N11 and N12 to produce the following output conditions: N9 off, N10 off, N11 off, and N12 off. Accordingly, neither time delay circuit TD or TD' is turned on. Accordingly, the third and fourth signals, a pulse and a space, respectively, are short. When NOR element N1 turns on at the end of the last space signal, NOR element N2 turns off to effect advancement of the binary counter BC to the third mark or pulse condition. This effects turn off of all NOR elements in the signal coder SC and effects turn on of NOR elements N13 in the operating element O. The output from operating element O to NOR element N3 prevents NOR element N3 from providing a signal to turn off NOR element N1 in response to turn off of NOR element N2. Accordingly, the signal generator TSG locks-up so that NOR element N1 will provide a continuous signal on the signal channel until the hold signal from operating element O is terminated. When switch MS3 is released by the operator, the start element S turns on to provide a signal to the signal generator TSG to return it to the reset condition wherein NOR element N1 turns off and NOR element N2 turns on. At the same time, the signal from start element S to the binary counter BC resets the counter to the reset condition (see FIG. 4). The binary counter BC in turn provides signals to all the NOR elements N9, N10, N11 and N12 in the signal counter SC and to the NOR element M3 in the operating element O to turn them off. This completes sending of the code, comprised of a short pulse, a long space, a short pulse, a short space, and a variable length pulse.

*Remote station signal generator*

The remote station signal generator RSG (FIG. 3) provides a first output signal only when a mark or pulse is present on the signal channel, and provides a second output signal only when a space signal is present on the signal channel. Specifically, the signal generator RSG is comprised of a pair of NOR elements N15 and N16 connected in tandem with the input of the NOR element N15 connected to the signal channel and with the output of NOR element N15 connected to the input of NOR element N16 and other logic elements to be hereinafter described. When a mark or pulse signal is present on the signal channel, NOR element N15 turns off thus terminating its output to NOR element N16 which turns on. Alternatively, when a space signal is present on the signal channel, NOR element N15 turns on to provide a signal to turn off NOR element N16.

*Remote signal counter*

The remote binary counter RBC is identical to the hereinbefore described binary counter BC, and is comprised of a pair of FLIP-FLOPS FF3 and FF4 connected in tandem and corresponding in operation to FLIP- FLOPS FF1 and FF2, respectively, in the binary counter BC. FLIP-FLOP FF3 includes NOR elements N17 and N18 corresponding to NOR elements N5 and N6, respectively, in FLIP-FLOP FF1. FLIP-FLOP FF4 includes NOR elements N19 and N20 corresponding to NOR elements N7 and N8, respectively, of FLIP-FLOP FF2. The input to FLIP-FLOP FF3 is connected to the output of NOR element N15 in the previously described signal generator RSG. Accordingly, each time a pulse or mark appears on the signal channel, the binary counter RBC changes its count condition for the three marks, as indicated in FIG. 4. The counter assumes the reset condition of FIG. 4 when the reset timer RT, as hereinafter described in detail, provides an output signal to NOR elements N18 and N20.

*Mark timer*

The mark timer MT functions to time the length of each pulse or mark as indicated by the previously described signal generator RSG, and operates to provide an output only if the mark or pulse is long. The mark timer is comprised of a mark time delay circuit MTD having its input connected to the output of NOR element N16 and having the output connected to a Zener diode input of a FLIP-FLOP FF5 comprised of NOR elements N21 and N22. The other input to the FLIP-FLOP FF5 is connected to the output of the NOR element N15 of the signal generator RSG. The mark time delay circuit MTD is identical to the time delay circuit TD and TD′ of the previously described signal generator TSG at the control station, and is characterized by having a time delay period longer than a short pulse and shorter than a long pulse. Normally, the mark time delay circuit MT is in a first condition or reset condition wherein the absence of a mark or pulse on the signal channel provides a signal from NOR element N15 to turn off NOR element N22 and wherein at the same time NOR element N16 is turned off to thus provide no signal to NOR element N21, which turns on to provide a signal to turn off pulse register elements in the register system to be hereinafter described in detail. When a pulse or mark appears on the signal channel to turn off NOR element N15 and turn on NOR element N16, mark time delay circuit MT does not change to its other condition unless the pulse is long in which event MTD times out to provide an input to turn off NOR element N21, which in turn turns on NOR element N22 since the previously described input to NOR element N22 from NOR element N15 in the signal generator RSG has now disappeared.

*Space timer*

The space timer ST functions to time the length of each space as indicated by the previously described signal generator RSG, and operates to provide an output to the hereinafter described register system R only if the space is long. The space time delay system ST is identical to the previously described mark timer MT and comprises a space time delay circuit STD connected to a FLIP-FLOP FF6 including NOR elements N23 and N24. The input to the space timer ST is connected to the signal generator RSG in a manner opposite to that of the mark timer MT, that is, the input to the timer delay circuit STD is connected to the output of the NOR element N15, while the other input to the space timer ST is connected to the output of NOR element N16. Accordingly, when a long space is present on the signal channel, time delay circuit STD times out to provide a signal to turn off NOR element N23 which turns on NOR element N24. As will be hereinafter described, when NOR element N24 turns on, its output signal operates to turn off certain long space register elements in the hereinafter described register system.

*Register system*

The register system R is controlled by the cooperation of mark timer MT, the space timer ST, and the binary counter RBC to register the length of each signal, pulse or space, in the signal interval in the order in which it is received from the signal channel. Specifically, the register system operates to register each long signal in the signal interval in which it is received, and, where no long signal is received, registers a short signal. Thus, all signals received are presumed short unless the mark timer MT or space timer ST indicates a received signal to be long. Each register element R1–R4 is comprised of a NOR element N25–N28, respectively, responsive to the described inputs from the binary counter RBC and the mark timer MT and the space timer ST, each NOR element N25–N28 having its output connected to one side of a NOR element FLIP-FLOP FF7–FF10, respectively, each of which FLIP-FLOPS responds to a null input condition at the corresponding NOR element N25–N28 to change from a reset condition to the long signal register condition. The other side of each FLIP-FLOP FF7–FF10 is connected to the output of a reset system to be hereinafter described in detail. Each FLIP-FLOP FF7–FF10 is comprised of a pair of NOR elements N29–N30, N31–N32, N33–N34, and N35–N36, respectively. Accordingly, when all the input signals terminate at the input to any one of the register elements R1–R4, an output is provided to turn off the corresponding FLIP-FLOP NOR element N29, N31, N33, N35, respectively, thus terminating an input signal to a corresponding decoder to be hereinafter described in detail. As the FLIP-FLOPS FF7–FF10 operate, the corresponding NOR elements N30, N32, N34 and N36 turn on.

To illustrate a typical operation of the register system, assume a long pulse is delivered to the remote station on the first signal. Accordingly, mark timer MT terminates its signal to NOR element N25 of register element R1, and, inasmuch as the counter RBC also terminates its signals to N25 on the first pulse, N25 provides an output signal to turn off NOR element N29 and turn on NOR element N30. If the first pulse is short, the mark timer MT and FLIP-FLOP FF7 remain reset. Similarly, if the second signal, space, is long, the space timer ST operates its corresponding FLIP-FLOP FF8 to register a long space signal. When the second mark appears on the signal channel, the binary counter RBC assumes the second pulse-space condition of FIG. 4 thus terminating its output only to register elements R3 and R4. Accordingly, if either the second pulse or the second space is long, mark timer MT or space timer ST, respectively, will terminate its output to R3 or R4, respectively, which register elements in turn will terminate their corresponding output signals to the appropriate decoder element as hereinafter described.

An additional register element R5 is provided to provide an output signal only on the last pulse regardless of the length of the pulse beyond the short time delay condition. Register element R5 comprises a NOR element N37 having two inputs connected to the binary counter RBC NOR elements N17 and N19 which NOR elements are off only during the third pulse (see FIG. 4) and having another input connected to the output of NOR element N15 of the signal generator RSG. The output of NOR element N37 is connected to the input of NOR element N38 which turns off only when the NOR element N37 provides an output. Thus, as the last pulse arrives on the signal channel, all input signals are terminated to register element R5 which provides an output to turn off NOR element N38 to terminate the output signal from register element R5 to the decoder.

*Decoder*

The decoder D comprises a plurality of NOR elements N40–N47, each having five inputs, four of which inputs are each connected to a different combination of eight outputs of the register elements R1–R4 taken cumulatively, each combination relating to one of the codes of FIG. 5, and the fifth input connected to NOR element N38, of the register element R5.

For example, NOR element N42 has its inputs connected to the outputs of register system R as follows: One input connected to the output of NOR element N30 in FLIP-FLOP FF7, which output is turned off only when register element R1 remains reset to register a short signal, one input connected to the output of NOR element N31 in FLIP-FLOP FF8, which output is turned off only when register element R2 registers a long signal, one input connected to the output of NOR element N34 in FLIP-FLOP FF9, which output is turned off only when register element R3 remains reset to register a short signal, one input connected to the output of NOR element N36 in FLIP-FLOP FF10, which output is turned off only when the register element R4 remains reset to register a short signal, and an input connected to the output of NOR element N38 in register element R5 on the last pulse regardless of its length. When the received code is comprised of signals which are short S or long L in the sequence SLSS, as provided by operation of momentary switch MS3 in FIG. 5, NOR element N42 responds to the absence of input signals to provide an output to operate a motor (not shown) similar to the motor M shown connected across the outputs of NOR elements N40 and N41 in the decoder D. It is understood that the motor M may drive or operate a valve or other movable apparatus. It is seen that NOR element N40 in the decoder D may be assigned the function of operating a motor M in a first direction in response to the operation of momentary switch MS1 at the control station, while NOR element 41 may be connected to reversely operate the same motor in response to operation of momentary switch MS2 at the control station. Similarly, succeeding pairs of NOR elements N42–N47 may also be connected to operate similar motor control apparatus.

*Reset timer*

The reset timer RT functions to reset the apparatus at the remote station after completion of the control operaion or in the event the operation is not completed within the expected transmission time. The reset timer RT responds to an unduly long space period between pulses or at the end of a transmission to effect reset of all remote station apparatus, and is the same in structure as the previously described spaced timer ST except that the time delay section of the reset timer RT is set slightly longer than a long pulse or space. The reset time delay circuit RTD has its output connected to the input of a NOR element N48 which comprises one-half of a FLIP-FLOP FF11 having another NOR element N49. When a transmission ends, NOR element N15 in the signal generator RSG is providing a signal to the time delay circuit RTD which times out to turn off NOR element N48 and to turn on NOR element N49. The output of NOR element N49 is connected to the binary counter RBC to reset the counter to the reset condition (see FIG. 4) when NOR element N48 turns off. The output of NOR element N49 is also connected to the other reset inputs of each of FLIP-FLOP FF7–FF10 to reset the register elements R1–R4 in the register system R. When a pulse appears on the signal channel, NOR element N15 turns off and NOR element N16 turns on to reverse the operation of the FLIP-FLOP FF11 in the reset timer RT thus terminating the inputs to the register system R and the binary counter RBC to permit them to respond to the incoming signals on the signal channel. As each space appears, the reset timer RT times the duration of the space and if the space is unduly long, will operate to reset the remote station apparatus as described.

*Typical operation of remote station*

The signals generated at the control station, as hereinbefore described, are transmitted to the remote station over the signal channel. In the signal generator RSG, the first signal, a pulse, turns off NOR element N15 and turns on NOR element N16. As the signal from N16 comes on, space timer ST and reset timer RT are reset. As the signal from NOR element N15 goes off, the binary counter RBC is advanced one step from the reset condition to the first count condition for the first mark and space signals (see FIG. 4). As NOR element N16 turns on, the mark signal is fed to the mark timer MT, which does not time out because the first signal in the code for momentary switch MS3 is short. Accordingly, the register element R1 remains reset with NOR element N30 off and NOR element N29 on. After a short pulse period, NOR element N15 turns on and NOR element N16 turns off in response to the first space period. As NOR element N15 turns on, its signal is fed to the mark timer MT which resets and to the space timer ST which times out since the second signal, a space, is long. Accordingly, FLIP-FLOP FF6 changes from the reset condition to turn off NOR element N23, which signal from NOR element N23 in combination with the outputs from NOR elements N17 and N20 in the binary counter RBC causes the register element R2 to change from the reset condition to turn off NOR element N31 and to turn on NOR element N32 in FLIP-FLOP FF8. Again, NOR element N15 turns off and NOR element N16 turns on in the signal generator RSG as the third signal, the second pulse, come in, thus resetting the space timer ST and the counter RBC advances to another count corresponding to the second mark-space condition of FIG. 4 wherein NOR elements N18 and N19 are turned off simultaneously. Since the second pulse is short, the mark timer MT does not time out, and the register element R3 remains in the reset condition with NOR element N34 off and NOR element N33 on. In the signal generator RSG, again NOR element N15 turns on and NOR element N16 turns off for the fourth signal, a short space. The space timer ST does not time out and the register element R4 remains in a reset condition with NOR element N36 off and NOR element N35 on. When the last signal arrives, a pulse, NOR element N15 turns off and NOR element N16 turns on to advance the binary counter to the third mark condition wherein NOR elements N17 and N19 are simultaneously turned off to thus turn on NOR element N37 in register element R5, thus terminating the signals from the corresponding NOR element N38. The condition in the register system R is such that NOR element N30 is off, NOR element N31 is off, NOR element N34 is off, NOR element N36 is off, and NOR element N38 is off to thus turn on only one decoder element, namely NOR element N42, which then operates a corresponding motor mechanism for the duration of the last pulse signal. When the last pulse terminates, the reset timer RT responds to the turning on of NOR element N15 and the turning off of NOR element N16 in the signal generator RSG to reset the binary counter RBC and the register system R. A control operation corresponding to operation of momentary switch MS3 is completed.

Having described the invention in accordance with the provisions of the patent statutes, it is to be understood that various changes and modifications may be made in the particular embodiment disclosed without departing from the spirit of this invention.

We claim as our invention:

1. A control station, comprising: transmitter means comprising a first pair of NOR element means each having an input connected to the output of the other and operable to transmit in alternate and successive relationship pulse and space types of relatively short and long duration signals over a signal channel; a second pair of NOR elements each having an output connected to the input of one of said first pair of NOR element means and at least one input connected to the output of the other of said pair of NOR element means; variable time delay means connected between each NOR element of said second pair and the associated NOR element of said second pair; and means comprising a plurality of NOR element means connected in circuit relation with said second pair of NOR elements operable to selectively effect operation of the transmitter means to selectively send a different combination of any one duration for each signal in a predetermined number of consecutive signals to provide codes of different signal durations, each code including said predetermined number of signals.

2. A control station, comprising: a multivibrator operable to generate successive alternate pulse and space signals to apply to a signal channel; said multivibrator including separate time delay circuit means for said pulse and space signals each having a resistor and at least a first capacitor to establish a minimum length for each type of signal, a second capacitor connected in circuit relation with each time delay circuit means, and transistor means connected in circuit relation with each of the second capacitors and operable when saturated to operatively connect the second capacitor in parallel with the first capacitor in one of the time delay circuit means to increase the signal length of one of the pulse and space signals at a time; and means connected in circuit relation with said transistor means operable to saturate one of the transistor means at a time to vary the length of predetermined ones of a sequence of a number of pulse and space signals to provide a code.

3. A control station, comprising: a multivibrator comprising a first NOR element and a second NOR element each having its output connected to an input of the other, first and second resistor-capacitor time delay circuit means each having an output and an input, a third NOR element having an output connected to the input of the first time delay circuit and having an input connected to the output of the second NOR element, a fourth NOR element having an output connected to the input of the second time delay circuit and having an input connected to the output of the first NOR element, first and second Zener diodes, each of said Zener diodes being connected between the output of one of the time delay circuits and the input of one of the first and second NOR elements, each Zener diode being operable to oppose a signal from the corresponding time delay circuit to the corresponding NOR element; means connecting the output from the first NOR element to a signal channel; first and second saturable transistor means; first and second additional capacitor means operable to be additively connected to the capacitor means in one of the resistor-capacitor circuit means by saturation of one of the saturable transistor means; means connected to another input of each of the third and fourth NOR element means and to the transistor means for starting the multivibrator and for selectively saturating the first and second transistor means on predetermined ones of a plurality of half cycles of the multivibrator to provide a code comprising a sequence of different lengths of each pulse and space in successive pulses and spaces.

4. A control station, comprising: transmitter means operable to apply successive alternate pulse and space control signals to a signal channel; a code selector connected in circuit relation with said transmitter means operable to effect operation of the transmitter means to apply the signals in accordance with a predetermined one of a plurality of codes each including a plurality of sequential pulses and spaces; said code selector comprising a plurality of switch means connected in parallel, each of said switch means being operable to select a different code; circuit means connected in circuit relation with said transmitter means including a NOR element and actuable to turn off the transmitter; a transistor connected in circuit relation with said switch means and said circuit means to normally apply an input to said NOR element for preventing operation of the circuit means to turn off the transmitter when the transistor is cut-off and having a base-emitter circuit positively biased to cut-off; each of said switch means being operable when closed to connect a negative source through a corresponding impedance to the base of said transistor, the closing of one switch means being arranged to merely reduce the positive bias on said transistor, the closing of two or more switches being arranged to effect a parallel arrangement of the corresponding impedances to draw a current overriding the positive biasing of said transistor and saturating the transistor to actuate said NOR element to turn off said transmitter means.

5. A signal transmitter comprising a multivibrator for producing a series of alternate pulses and spaces in sequence comprising a first NOR element and a second NOR element, each of said NOR elements having an output connected to an input of the other NOR element, first and second time delay circuits each including a resistor and at least a first capacitor and having an output and an input, a third NOR element having an output connected to the input of said first time delay circuit and having an input connected to the output of said second NOR element, a fourth NOR element having an output connected to the input of said second time delay circuit and having an input connected to the output of said first NOR element, coupling means connected between the output of each of said time delay circuits and one of said first and second NOR elements to permit the passage of a signal from the third and fourth NOR elements to said first and second NOR elements, respectively, when the output of one of the corresponding time delay circuits exceeds a predetermined value, means for connecting the output of said first NOR element to a signal channel, and means connected in circuit relation with said time delay circuits for operatively connecting an additional capacitor in each of said time delay circuits during selected pulses and spaces of said multivibrator to form a coded sequence of pulses and spaces at the output of said first NOR element.

6. A control station, comprising: a multivibrator comprising a first NOR element and a second NOR element each having its output connected to an input of the other, first and second resistor-capacitor time delay circuit means each having an output and an input, a third NOR element having an output connected to the input of the first time delay circuit and having an input connected to the output of the second NOR element, a fourth NOR element having an output connected to the input of the second time delay circuit and having an input connected to the output of the first NOR element, first and second Zener diodes, each of said Zener diodes being connected between the output of one of the time delay circuits and the input of one of the first and second NOR elements, each Zener diode being operable to oppose a signal rom the corresponding time delay circuit to the corresponding NOR element, means connecting the output from the first NOR element to a signal channel; first and second saturable transistor means; first and second additional capacitor means operable to be additively connected to the capacitor means in one of the resistor-capacitor circuit means by saturation of one of the saturable transistor means; signal coder means connected in circuit relation with said third and fourth NOR elements to control the saturation of said first and second transistor means to effect coding of the output signals from said multivibrator, said signal coder including a plurality of NOR elements each corresponding to a different interval of the output signals from said multivibrator, actuable means connected in circuit relation with said first NOR element to start the output signals of said multivibrator, and a code selector comprising a plurality of momentary switches connected in circuit relation with said starting means and said signal coder to actuate said starting means and said signal coder to actuate said starting means and to select a predetermined signal code, said signal coder also including means to maintain the transmission of the last signal of each code selected until the operated momentary switch is released.

7. A remote station responsive to a predetermined number of successive pulse and space type signals received alternately, each signal being presented in one or the other of two states of either relatively short or long duration to provide a coded sequence of states corresponding to one of a plurality of operations to be performed; a receiving signal generator for repeating the received signals; first detecting means connected in circuit relation with said receiving signal generator and including a FLIP-FLOP having an input and an output operable by the receiving signal generator to assume an output condition only in response to a pulse type of signal and operable to be reset by the receiving signal generator when responding to the other type of signal; second detecting means connected in circuit relation with said receiving signal generator including a FLIP-FLOP having an input and and output operable by the receiving signal generator to assume an output condition only in response to a space type of signal and operable to be reset by the receiving means when responding to a pulse type of signal; a binary counter connected in circuit relation with said receiving signal generator and said first and second detecting means and comprising a plurality of FLIP-FLOPS connected in tandem and operable to advance one count in response to a pulse type of signal from the receiving signal generator; register means connected in circuit relation with said counter and said first and second detecting means and comprising a plurality of flip-flop means, each of said flip-flop means corresponding to one signal interval in a code and each having inputs operable in response to operation of the counter and the first and second detecting means to operate only when the corresponding signal is in one of said two different states; said decoder means connected in circuit relation with said binary counter to be responsive to operation of the register means to perform an operation corresponding to the registered code.

References Cited by the Examiner

UNITED STATES PATENTS

| | | | |
|---|---|---|---|
| 2,419,292 | 4/47 | Shepard | 340—167 |
| 2,449,819 | 9/48 | Purington | 340—167 |
| 2,708,744 | 5/55 | Neiswinter | 340—167 |
| 2,812,509 | 11/57 | Phelps | 340—167 X |
| 3,049,628 | 8/62 | Kaufman | 307—88.5/3.4 |

NEIL C. READ, *Primary Examiner.*

EVERETT R. REYNOLDS, THOMAS B. HABECKER, *Examiners.*